(12) United States Patent
McGrew et al.

(10) Patent No.: US 6,614,901 B1
(45) Date of Patent: Sep. 2, 2003

(54) METHOD AND SYSTEM FOR A SCALEABLE VIRTUAL SWITCH

(75) Inventors: Michael Arthur McGrew, Columbus, OH (US); David Michael Rouse, Granville, OH (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/396,390

(22) Filed: Sep. 15, 1999

(51) Int. Cl.[7] .................................................. H04M 7/00
(52) U.S. Cl. .............. 379/230; 379/221.12; 379/221.15
(58) Field of Search ................................. 379/229, 230, 379/207.02, 219, 220.01, 221.1, 242, 221.12, 221.15; 370/385, 217, 225, 356

(56) References Cited

U.S. PATENT DOCUMENTS

| | | | | | |
|---|---|---|---|---|---|
| 5,440,626 | A | * | 8/1995 | Boyle et al. | 379/219 |
| 5,881,132 | A | * | 3/1999 | O'Brien et al. | 379/230 |
| 6,282,194 | B1 | * | 8/2001 | Cheesman et al. | 370/356 |
| 6,327,260 | B1 | * | 12/2001 | McGrew | 370/217 |

* cited by examiner

*Primary Examiner*—Benny Tieu

(57) ABSTRACT

A telecommunication network having a telephonic switch with a message signal controller connected to a plurality of other telephonic switches by a plurality of associated common-channel signaling links, each associated common-channel signaling link terminating at the message signaling interface at the telephonic switch and one of the plurality of other telephonic switches for transmission of telephonic signaling information.

28 Claims, 6 Drawing Sheets

METHOD AND SYSTEM FOR A SCALEABLE VIRTUAL SWITCH

BACKGROUND OF THE INVENTION

This invention relates to telecommunication networks which contain switching and signaling network elements, and more particularly telephonic switch network elements and signal transfer points having Signaling System 7 controllers for the routing of messages.

The Signaling System No. 7 protocol has been mandated for out-of-band signaling communication involving telecommunication network elements and has been implemented worldwide. Signaling System No. 7 (SS7) network elements are each uniquely identified by a Message Transfer Part (MTP) Signaling Point Code (PC). Network administrators set up routes through a SS7 network so that the network elements can send Message Signal Units (MSUs) from any network element to any other network element in the telecommunication network.

Two types of network elements are public switched telephone network (PSTN) switches and signal transfer points (STPs). PSTN switches control the telephone and service traffic that is provided by the telecommunications operating company. A key to the success of a telecommunication service provider is for its PSTN switches to provide continuous service. It is critical that the customers of the service provider have the ability to communicate through the telecommunications network via a PSTN switch associated with the particular customer. Moreover, there are federal (United States) and world (International Telecommunications Union—Telecommunications (ITU-T)) reporting requirements for SS7 failures ("outages") above a certain threshold. The STPs act as signaling hubs for concentrating SS7 signaling link sets so the PSTN switches do not need to be fully interconnected. However, the concentration of signal link sets from the PSTN switches to a central PSTN switch by the STP results in an artificial limit on the scaleable capacity of the PSTN switches connected to the STP.

Network elements, such as the PSTN switches and the STPs, are interconnected by a group of signaling links called a link set that all originate and terminate between the same pair of Signaling Point Codes. A benefit of Signaling System No. 7 (SS7) is that the signaling is out-of-band. The out-of-band signaling enables the routing of the telephonic signals for setting up and ending calls separate from the communication or bearer channels. The bearer channels between switches are grouped together into trunk groups. A signaling route for out-of-band signaling is assigned to transport the signaling for each trunk group. The signaling links between the STP and the PSTN switch are referred to as A-Links and are identified by three parameters, the two Point Codes (PCs) at each end of the link and a Signaling Link Code (SLC). When multiple links are deployed between PCs the signaling links are combined together. The grouping of signaling links associated with a trunk group is commonly referred to as a link set. Associated common-channel signaling links between two PSTN switches that are fully associated (transport only signaling messages for associated trunk groups) are referred to as F-links and are identified by the same three parameters as an A-Link.

Referring to FIG. 1, an SS7 network diagram illustrating link set deployment with multiple PSTN switches 14, 16, 18, a central PSTN switch 20, trunk groups 30, 32, 34, and a pair of redundant STPs 10A, 10B is shown. The redundant STPs 10A, 10B have only individual A-Link link sets 22, 24, 26 or 28 for connecting the STPs 102A, 102B to the respective PSTN switches 14, 16, 18, and 20. It is noted that the trunk groups 30, 32, and 34 containing the actual bearer channels between the PSTN switches 14, 16, and 18 and the central PSTN switch 20. Because the STPs 10A, 10B interconnect the signaling between the PSTN switches 14, 16, 18 and the central PSTN switch 20, it is important to the telecommunications service provider, and invariably to its customers, that the STPs 10A, 10B must not fail. Due to network redundancy in that STPs are generally provided in redundant pairs, 10A, 10B, one STP can take over the processing for a failed mate.

Disadvantageously, however, the PSTN switches 14, 16, 18, 20 are dependent on their respective single common-channel signaling interface link sets 22, 24, 26, 28 for their total SS7 network communication capabilities. If a hardware or software failure exists, or a generic software update is required, it is almost certain that a signaling outage will occur at a telephonic switch. Once this happens the switch becomes isolated and telephonic communication is lost at all telephonic units associated with the switch during the isolation period. Signaling communication at a switch following SS7 protocol is dependent on and thus, is limited by its lone signaling interface which unfortunately leads to potential switch isolation upon operational failures, upgrades to the system, or upon field events.

An additional disadvantage of A-Link link sets 22, 24, 26 being concentrated at the STPs 10A, 10B, into a single A-Link link set 28, is the difficulty in scaling up the signaling interface and controller functions of the PSTN switches 14, 16, and 18. An increase in capacity of PSTN switches 14, 16, and 18 can create signaling demands that exceeds the capacity of the A-Link link set 28 as calls are routed to the central PSTN switch 20 from the PSTN switches 14, 16, and 18. Moreover, as the call capacity increases, the impact of the A-Link link set 28 or the link controller at switch 20 failing is increased.

In order to address the capacity and fault issues, the telecommunication network can be redesigned and additional link sets and STPs can be added to the network. This approach is undesirable because of the increased cost to the telecommunication service provided. Every PSTN switch and STP added to the network requires an environmental controlled room, electrical power, additional support and maintenance investment by the telecommunication service provider thereby increasing the overall cost. Therefore, there is a need in the art to prevent disruption of telecommunication signaling while being able increase the size and capacity of PSTN switches for the telecommunication network in a cost efficient manner.

SUMMARY OF THE INVENTION

The problems noted above are solved in accordance with the invention and a technical advance is achieved in the art, by providing associated common-channel signaling link sets between the PSTN switches and a central PSTN switch. An alternate signaling path may also be provided via a STP that concentrates the A-Link link sets from the PSTN switches into an A-Link link set connected to the central PSTN switch. The associated common-channel signaling links between the PSTN switches and the central PSTN switch allow the PSTN switches to increase capacity without overloading the A-link link set and requiring increased capacity at the STP. The reliability of the telecommunication network is also increased by distributing the signaling in the network among the PSTN switches, rather than routing the signaling between the PSTN switches and the central PSTN switch through the STP and a lone A-Link link set to the central PSTN switch.

The reliability of the central PSTN switch is further increased with independent message signal interfaces. The independent message signal interfaces are individual independent interfaces that terminate an individual SS7 link set at the central PSTN switch. Moreover, the independent message signal interfaces appear as one to the SS7 network but are actually totally independent elements. If an independent message signal interface fails, the other link sets terminating at the central switch are not affected and continue to function. The signaling information from the failed link set is rerouted over an A-Link link set via the STP, where it can be processed by the central switch element so signaling can continue uninterrupted. Additionally, upon a return to normal operation of the failed link set, the signaling information is transferred back to the associated common-channel signaling link set between the PSTN switch and the central PSTN switch.

BRIEF DESCRIPTION OF THE DRAWINGS

The foregoing objects and advantageous features of the invention will be explained in greater detail and others will be made apparent from the detailed description of the preferred embodiment of the present invention which is given with reference to the several figures of the drawing, in which.

DETAILED DESCRIPTION

Figure 1:
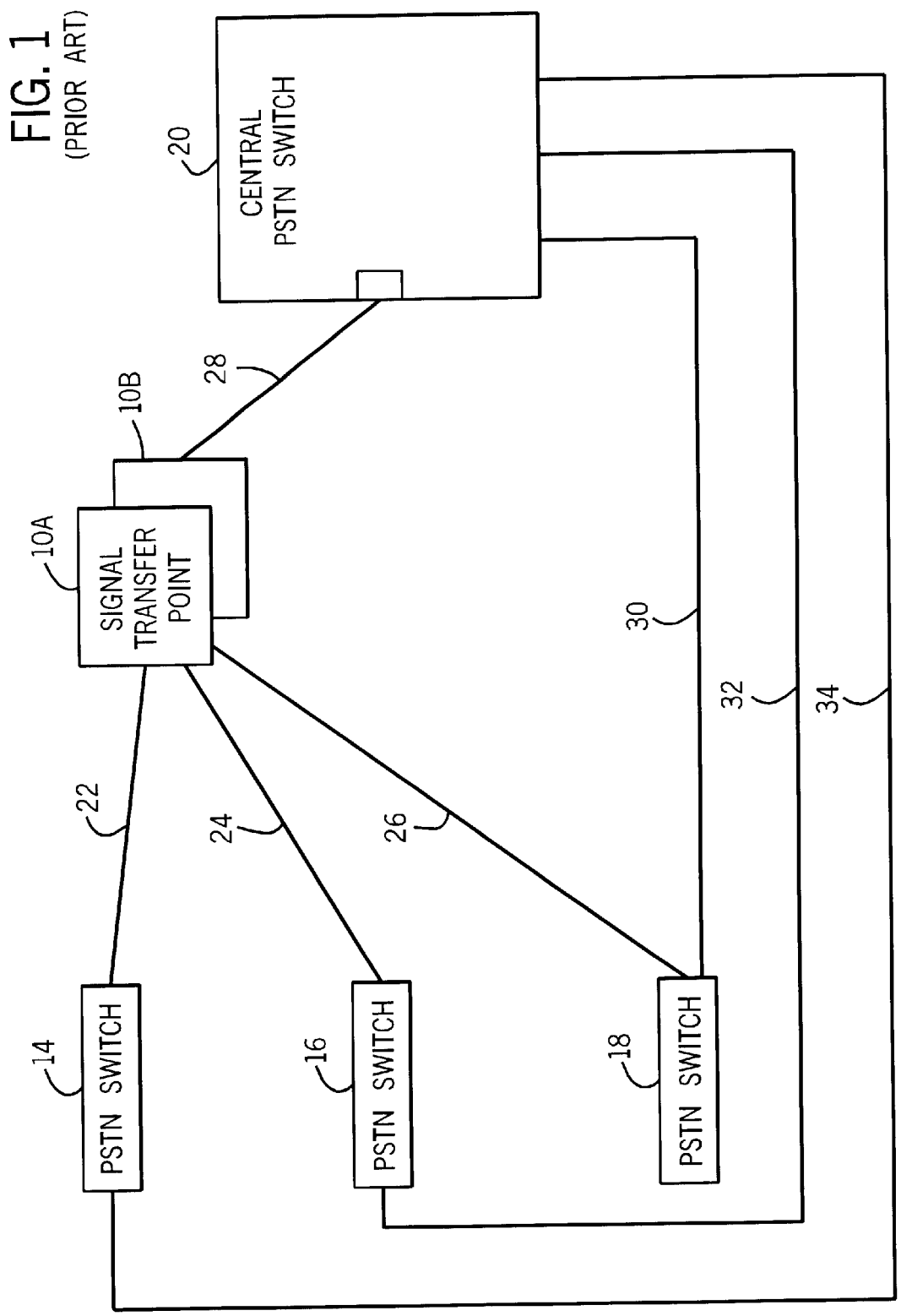
FIG. 1 is a block diagram of a known telecommunication network having a signal transfer point, central PSTN switch.
Figure 2:
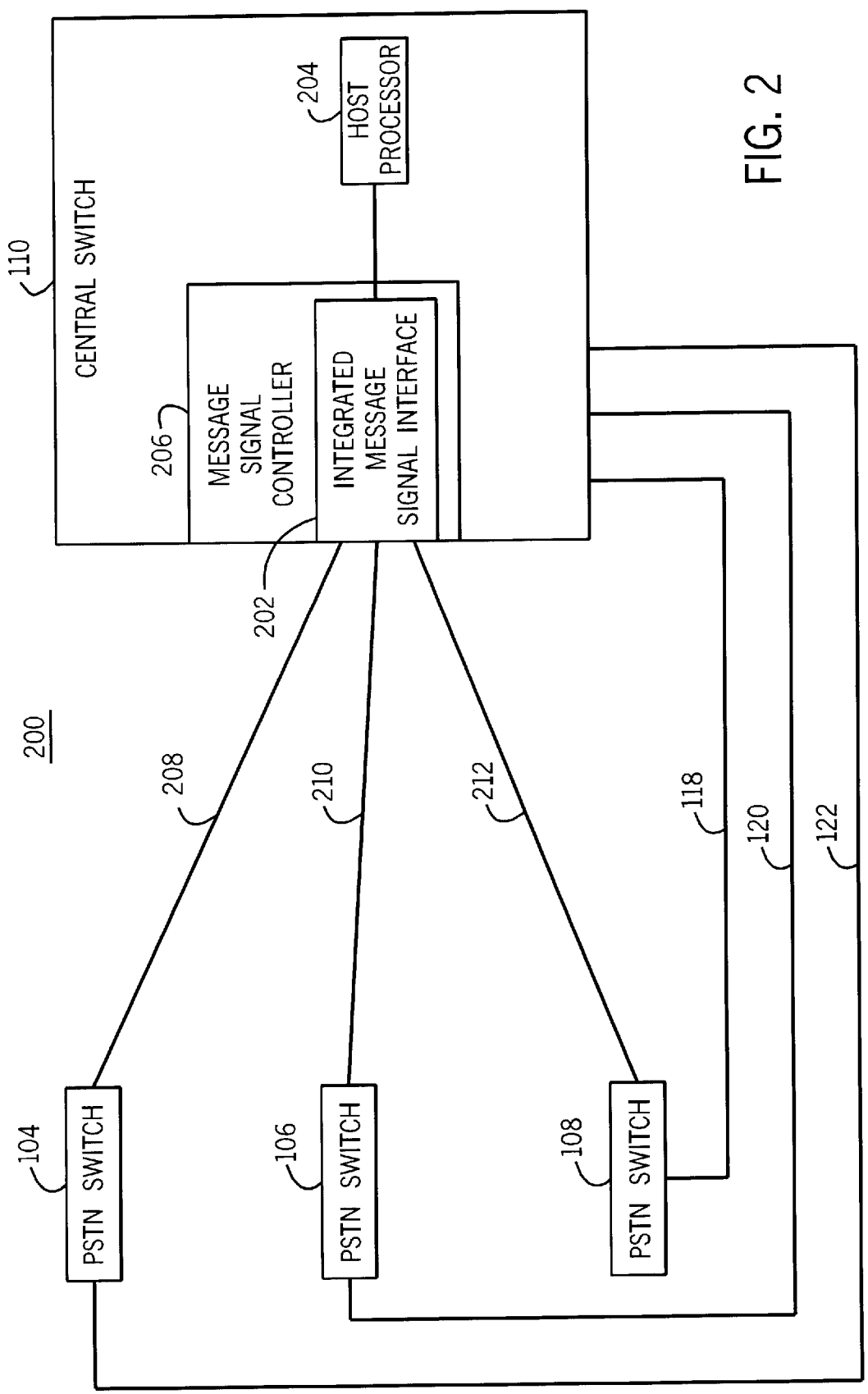
FIG. 2 is a block diagram of a telecommunication network having a central PSTN switch with an integrated message signal interface, and multiple PSTN switches connected by associated common-channel signaling link sets in accordance with an embodiment of the invention.

FIG. 2 illustrates a telecommunication network 200 having a central public switched telephone network (PSTN) switch 110 (telephonic switch) in which a message signal controller 206 has an integrated message signal interface 202 coupled to a host processor 204, and multiple PSTN switches (a plurality of other telephonic switches) 104, 106, 108. The PSTN switches 104, 106, 108 are connected by associated common-channel signaling link sets 208, 210, 212 to the integrated message signal interface 202 located at the central PSTN switch 110. Similarly, trunk groups 118, 120, 122 made up of individual communication channels are connected between each of the plurality of telephonic PSTN switches 104, 106, 108 and the central PSTN switch 110 for transportation of voice and data signals.

The central telephonic switch 110 is connected to the PSTN switches 104, 106, 108 by associated common-channel signaling links combined into link sets 208, 210, and 212. In associated common-channel signaling, the signaling channel is associated with a specific trunk group and terminates at the same pair of switches as the trunk group. The signaling for trunk group 122 between the PSTN switch 104 and the central PSTN switch 110 is carried by the common-channel signaling link set 208 and is terminated at the central PSTN switch 110 by the integrated message signal interface 202. The integrated message signal interface 202 is an interface at the central PSTN switch 110 that can terminate a number of associated common-channel signaling links. The integrated message signal interface 202 has common memory and processing resources and when an error or fault occurs, it affects the all the links terminated by the integrated message signal interface.

The signaling for the trunk group 120 between the PSTN switch 106 and the central PSTN switch 110 is carried by the common-channel signaling link set 210 and the signaling for the trunk group 118 between the PSTN switch 108 and the central PSTN switch 110 is carried by the common-channel signaling link set 212. Similarly, link sets 210 and 212 are terminated by the integrated message signal interface 202 at the central PSTN switch 110. The signaling link sets 208, 210, and 212 are composed of fully associated common-channel links, referred to as F-Link link sets 208, 210, 212. The integrated message signal interface 202 terminates all the F-Link link sets connected to the central PSTN switch 110. The signaling messages received by the integrated message signal interface 202 from the F-Link link sets are then processed by the host processor 204 at the central PSTN switch 110.

In an alternate embodiment, the traditional switch functions of the PSTN switch 110 having a message controller function and a switching function may be divided and distributed in the telephonic network. A controller device having the controller function may be a stand alone device or combined with another intelligent network device in a telephonic network. Furthermore, the controller function communicates across the telephonic network to the switching function creating a virtual switch.

The advantage of the telecommunication network as shown in FIG. 2, is that the signaling messages are directly sent from the PSTN switches 104, 106, 108 to the central PSTN switch 110. The capacity of the PSTN switches 104, 106, 108 can be scaled up and additional links and trunk groups can be added without worry of overloading a concentrated link as discussed above.

Figure 3:
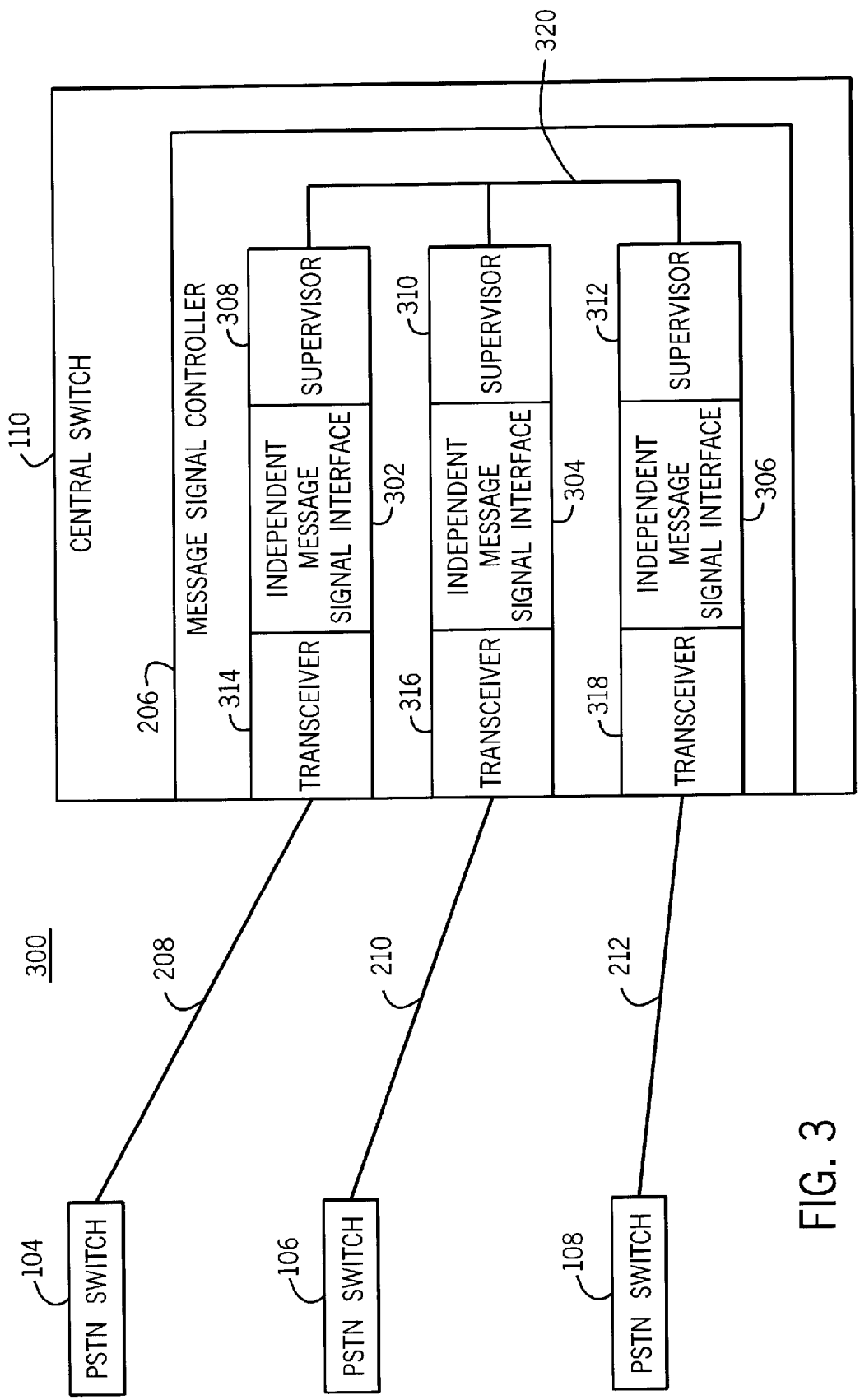
FIG. 3 is a block diagram of a telecommunication network having a central PSTN switch with independent message signal interface, and multiple PSTN switches connected by associated common-channel signaling link sets in accordance with an embodiment of the invention.

Referring now to FIG. 3, an alternative arrangement of telecommunication network 300 having a central telephonic PSTN switch 110 with a plurality of independent message signal interfaces 302, 304, 306 and a plurality of telephonic PSTN switches 104, 106, 108 is shown. The central PSTN switch 110 is connected to the PSTN switches 104, 106, 108 by associated common-channel signaling link sets 208, 210, 212 with each link set being terminated individually at a transceiver 314, 316, 318 on an independent message signaling interface 302, 304, 306 located in a message signal controller 206 at the central PSTN switch 110. Additionally, located on each of the independent message signaling interfaces 302, 304, 306 is an associated supervisor 308, 310, 312. The supervisors 308, 310, 312 monitor the independent message signal interfaces 302, 304, 306 and are coupled together forming a communication path 320 between the respective supervisors 308, 310, 312.

The supervisors 308, 310, 312 monitor the status of the independent message signal interfaces 302, 304, 306 and the signaling links. The supervisors 308, 310, 312 provide a monitoring function that can be implemented in software, as in the present embodiment, or in hardware. If a failure of the common-channel link function occurs, for example when the independent message signal interface, a processing element, other network elements, is detected by a supervisor, the other supervisors are notified of the failure over the common communication path 320. The detection of the failure in the present example is the supervisor 308, 310, or 312 identifying that the state of one of the common-channel link functions is unavailable. The other independent message signal interfaces then reroute the signaling messages for the failed independent message signal interface to an active interface in response to the notification from their associated supervisor. The supervisors 308, 310, 312 also detects when an independent message signal interface catastrophically fails (i.e. because the supervisor associated with the failed interface does not respond to polls from the other supervisors).

The associated common-channel signaling link sets 208, 210, 212 are connected between the PSTN switches 104, 106, 108 and the central PSTN switch 110, with each individual link set terminating at a corresponding transceiver 314, 316, 318 on the individual independent message interfaces 302, 304, 306. The advantage of using multiple independent message interfaces 302, 304, 306 is if an outage of a single independent message interface 302, 304, or 306 occurs, the only PSTN switch isolated from the telecommunication network is the PSTN switch associated with the link set having the faulty signal link function (i.e. the independent message controller, rather than all the PSTN switches 104, 106, 108). For further details on independent message signal interfaces reference can be made to U.S. patent application Ser. No. 09/063,175 of McGrew, entitled "CONTROLLED ROUTING TO A PLURALITY OF SIGNALING INTERFACES AT A SINGLE TELEPHONIC SWITCH", filed on Apr. 20, 1998, which is incorporated by reference herein.

Figure 4:
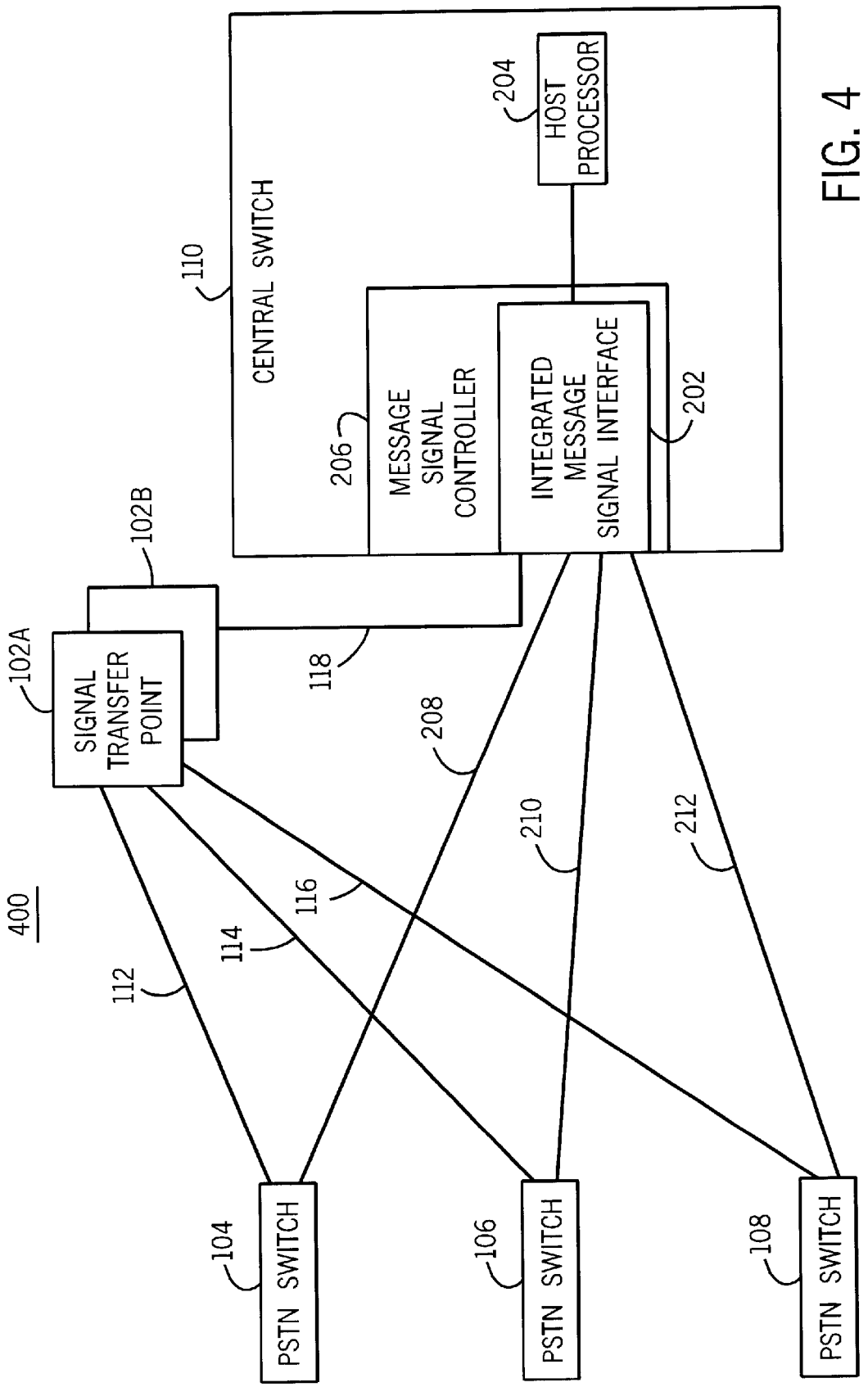
FIG. 4 is a block diagram of a telecommunication network having a central PSTN switch with an integrated message signal interface, redundant pair of STPs, and multiple PSTN switches connected by associated common-channel signaling link sets and A-Link link sets in accordance with an embodiment of the invention.

In FIG. 4, an alternative telecommunication network 400 arrangement having a central PSTN switch 110 with an integrated message signal interface 202, a redundant pair of STPs 102A, 102B, and multiple PSTN switches 104, 106, 108 is shown. Each of the PSTN switches 104, 106, 108 are connected by an associated common-channel link set 208, 210, 212 to the central PSTN switch 110. The individual associated common-channel link sets are terminated at an integrated message signaling interface 202 contained by the message signal controller 206 and coupled to the host processor 204 at the central PSTN switch 110. The redundant pair of STPs 102A, 102B are connected by A-Link link sets 112, 114, 116 to the respective PSTN switches 104, 106, 108. Additionally, the redundant pair of STPs 102A, 102B is connected by the link set 118 to the integrated message signal interface 202 at the central PSTN switch 110. The termination of the A-Link link set 118 and associated common-channel signaling link sets 208, 210, 212 at the integrated message signaling interface 202 creates an alternate signaling route between the central PSTN switch 110 and the PSTN switches 104, 106, 108 via the redundant pair of STPs 102A, 102B.

Figure 5:
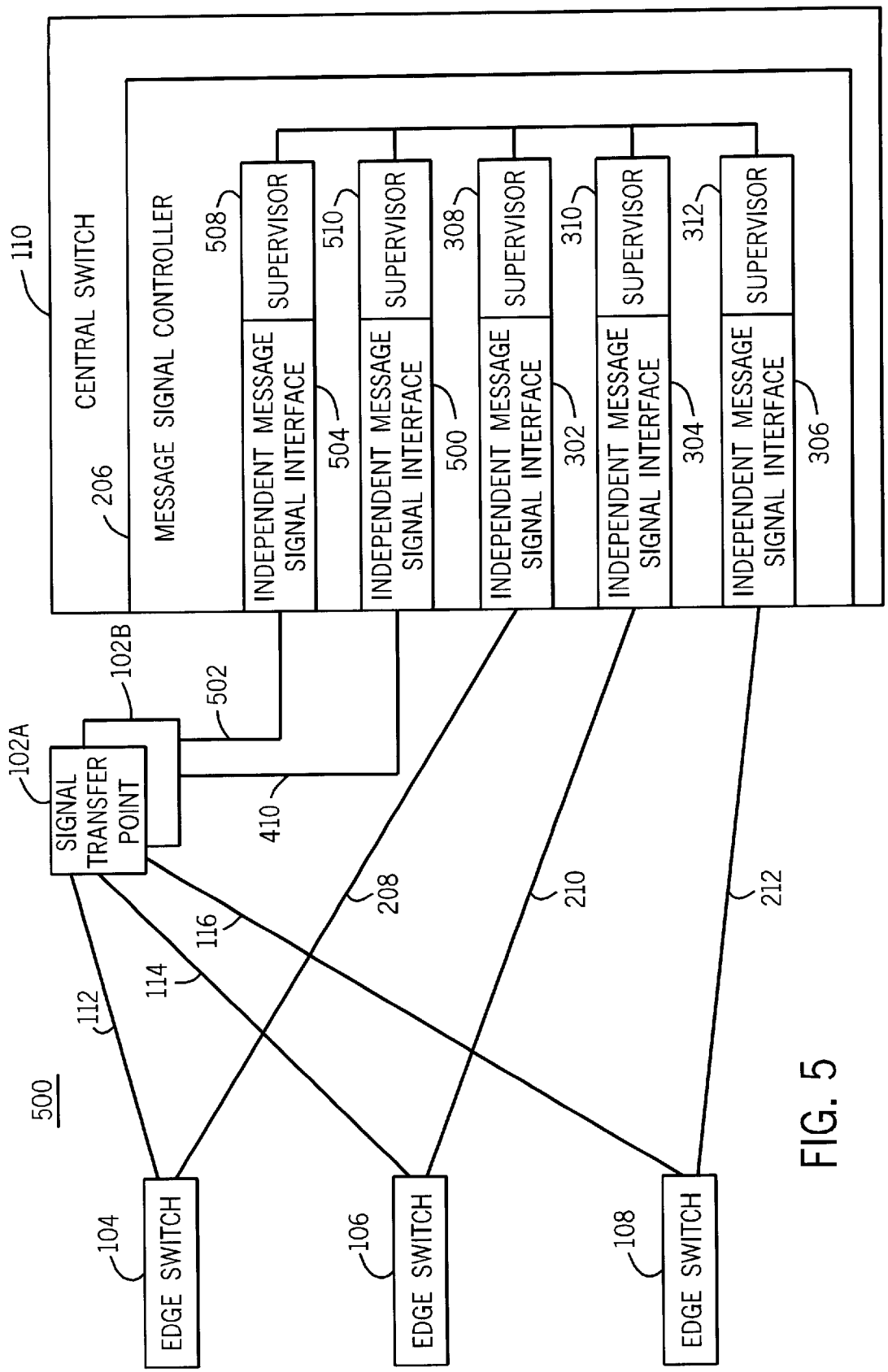
FIG. 5 is a block diagram of a telecommunication network having a central PSTN switch with independent message signal interface, redundant pair of STPs, and multiple PSTN switches connected by associated common-channel signaling link sets and A-Link link sets in accordance with an embodiment of the invention.

In FIG. 5, the arrangement seen in telecommunication network 500 has a central PSTN switch 110, a plurality of independent message signal interfaces 302, 304, 306, 504, 506, a redundant pair of STPs 102A, 102B, and multiple PSTN switches 104, 106, 108. The PSTN switches 104, 106, 108 are connected to the redundant pair of STPs 102A, 102B by A-Link link sets 112, 114, 116 respectively. The redundant pair of STPs 102A, 102B are connected to A-Link link sets 502, 410 which are each terminated individually by the independent message signal interface 504, 506 in the message signal controller 206 at the central PSTN switch 110. Each of the independent message signal interfaces 504, 506 has a supervisor coupled to the other supervisors 308, 310, 312 located on the other independent message signal interfaces 302, 304, 306. Additionally, the PSTN switches 104, 106, 108 are each connected by a respective associated common-channel signaling link set 208, 210, 212. Each of the associated common-channel signaling link sets 208, 210, 212 is terminated by an individual independent message signal interface 302, 304, 306 located at the central PSTN switch 110.

The telecommunication network shown in FIG. 5 with the central PSTN switch 110 containing independent message signal interfaces 302, 304, 306, 504, 506 reduces the impact of link set failures or message signal interface failure. If a link set such as link set 208 fails, then the PSTN switch 104 is not isolated from the telecommunication network. The signaling messages from the PSTN switch 104 are routed to the central PSTN switch 110 via the redundant STPs 102A, 102B. If STP 102A also fails, the signaling messages from the PSTN switch 104 are processed by STP 102B and routed to the central PSTN switch 110. If the independent message signal interface 506 connecting the redundant pair of STPs 102A, 102B with the central PSTN switch 110 happens to fail, the other independent message signal interface 504 continues to maintain a connection to the redundant pair of STPs 102A, 102B. The supervisor 508 on the independent message signal interface 504 determines that a failure has occurred on the independent message signal interface 506 and takes over routing messages to the redundant pair of STPs 102A, 102B. When the associated common-channel signaling link set 208 between the PSTN switch 104 and central PSTN switch 110 becomes available, the signaling information will once again be routed directly to the central PSTN switch 110. It is understood that the above described route selection between the PSTN switches 104, 106, 108 and the central PSTN switch 110 would be similar for messages sent from the central PSTN switch 110 to the PSTN switches 104, 106, 108.

Therefore, the telecommunication network is scaleable and more reliable because of the redundant pair of STPs 102A, 102B and independent message signal interfaces 302, 304, 306, 504, 506 located at the central PSTN switch 110. The scaleability with signal interfaces 302, 304, 306, 504, and 506 allows for virtual switches comprised of existing network entities without the additional environmental expenses, such as environmental controlled rooms. The redundant pair of STPs increase the reliability of the telecommunication network by providing a second route for signaling between the PSTN switches 104, 106, 108 and the central PSTN switch 110. The independent message signal interfaces 302, 304, 306 terminating the associated common-channel signaling link sets from the PSTN switches 104, 106, 108 and the alternate route provided via the STPs 102A, 102B prevents all PSTN switches 104, 106, 108 from being isolated from the central PSTN switch 110 due to a message signal controller failure. Additionally, the independent message signal interfaces 302, 304, 306 between the central PSTN switch 110 and the PSTN switches 104, 106, 108 eliminate the signaling link set bottle neck associated with conventional systems.

In an alternate embodiment, the STP devices 102A, 102B may be implemented as signaling transfer functions residing on an intelligent network device located in the telephonic network. The signaling transfer functions route signaling messages through the telephonic network or internal to the virtual switch based on internal routing tables, destination point codes, origination point code, circuit ID or other signaling information necessary to perform the types of services requested.

Figure 6:
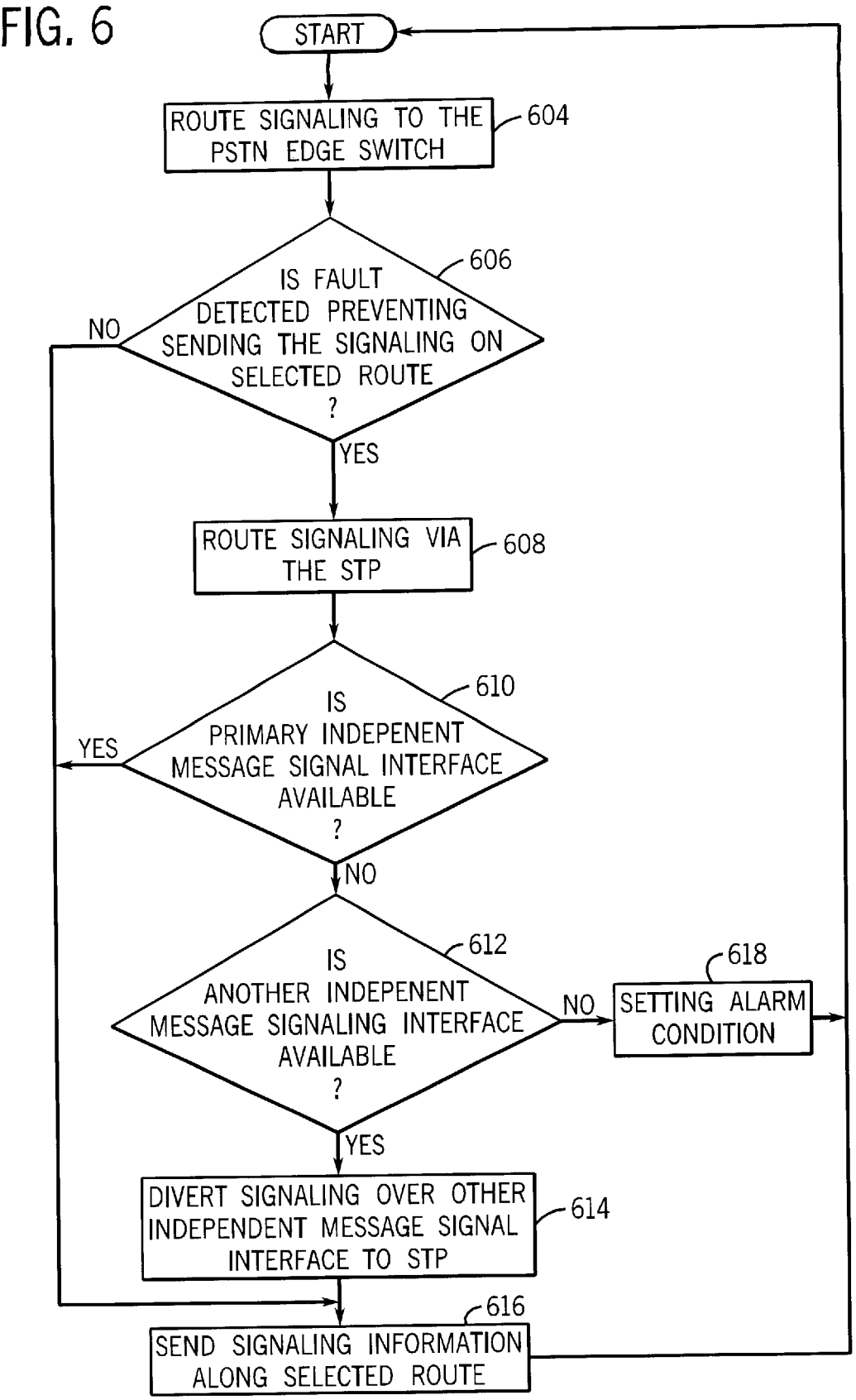
FIG. 6 is a flow chart diagram illustrating the steps performed at the central PSTN switch for transmission of signaling information across associated common-channel link sets in accordance with an embodiment of the invention.

Referring to FIG. 6, a flow diagram illustrating the steps performed at the central PSTN switch for transmission of signaling information across associated common-channel link sets is shown in accordance with the present invention. The steps performed include; routing signaling information to the PSTN switch, detecting an inability to successfully send signaling information along a selected route, routing the signaling messages via an STP, determining if the primary independent message signal interface to the STP is available, checking if another independent message signal interface to the STP is available, diverting signaling messages to the other independent message signal interface, sending signaling information along the selected route, and setting an alarm condition. The central PSTN switch 110, FIG. 5, is selectively configured such that a link set outage or independent message signal interface failure will not result in a PSTN switch 104, 106, or 108 being isolated from the telecommunication network.

When a communication channel is required between the central PSTN switch 110, FIG. 5, and PSTN switch 104, the central PSTN switch 110 initiates setting up a communication channel using out-of-band signaling over an associated common-channel signaling link (i.e. one link in the link set 208). In step 604, FIG. 6, the central PSTN switch 110, FIG. 5, selects the route for signaling over the associated common-channel signaling link set 208. Next in step 606, FIG. 6, the supervisor 308, FIG. 5, determines if the independent message signal interface 302 detects an error condition on the associated common-channel link set 208 or a fault within the independent message signal interface 302. If no errors or faults are detected, then in step 616, FIG. 6, the signaling message is sent to PSTN switch 104.

In step 608, FIG. 6, an alternate route through the redundant pair of STPs 102A, 102B, FIG. 5, is chosen. The supervisor 308 diverts the signaling messages for PSTN switch 104 to the independent message signal interface 506 that terminates the primary A-Link link set 410 connected to the STP. If the supervisor 510 in step 610, FIG. 6, determines that signaling messages can not be routed over the primary A-Link link set 410, FIG. 5, to the redundant pair of STPs 102A, 102B, then in step 612, FIG. 6, the other independent message signal interface 504 and secondary A-Link link set 502 are checked for availability by the supervisor 508. If the other independent message signal interface 504 and A-Link link set 502 to the redundant pair of STPs 102A, 102B are available, then in step 614, FIG. 6, the signaling message for PSTN switch 104, FIG. 5, from the central PSTN switch 110 is routed via the redundant pair of STPs 102A, 102B.

In step 616, FIG. 6, the signaling message is sent by the central PSTN switch 110, FIG. 5, over the selected route. In the present example, the selected route is an alternate route of the A-Link link set 502 through the redundant pair of STPs 102A, 102B, to PSTN switch 104 by A-Link link set But, during normal (no errors or failures detected) operations the selected primary route to the PSTN switch 104 is over the common channel signaling link set 208, but another alternate route via the redundant pair of STPs 102A, 102B over A-Link link set 410 may alternately be chosen when the primary route has failed.

If in step 612, FIG. 6, it is determined that there are no routes from the central PSTN switch 110, FIG. 5, to the PSTN switch 104, then the supervisor 308 at the central switch sets an alarm condition signaling to an operator that all paths to a network element are unavailable.

As has been shown in the above diagrams and flow chart, the robustness of the telecommunication network is increased by supplying a second path with the A-Link link sets between the redundant pair of STPs 102A, 102B and the central PSTN switch 110. Additionally, having independent message signal interfaces located at the central PSTN switch 110 for terminating associated common-channel signaling link sets from the PSTN switches 104, 106, 108, and A-Link link sets 410, 502 reduces the risk of all the PSTN switch 104, 106, 108 being isolated from telecommunication network because of a message signal interface failure. The associated common-channel signaling link sets 208, 210, 212 also avoid the artificial constraints created by the STPs 102A, 102B concentrating a greater number of A-Link link sets from PSTN switches 104, 106, 108 into a fewer number of A-Link link sets connecting the central PSTN switch 110. Therefore, the capacity of the PSTN switches 104, 106, 108 can be increased.

While the specification in this invention is described in relation to certain implementations or embodiments, many details are set forth for the purpose of illustration. Thus, the foregoing merely illustrates the principles of the invention. For example, this invention may have other specific forms without departing from its spirit or essential characteristics. The described arrangements are illustrative and not restrictive. To those skilled in the art, the invention is susceptible to additional implementations or embodiments and certain of the details described in this application can be varied considerably without departing from the basic principles of the invention. It will thus be appreciated that those skilled in the art will be able to devise various arrangements which, although not explicitly described or shown herein, embody the principles of the invention are thus within its spirit and scope.

Although an explanation of embodiments of the present invention have been made above with reference to the drawings, the scope of the invention is defined by the claims which follow.

What is claimed is:

1. In a telecommunication network having a telephonic switch for controlling telephonic call and service information which is transmitted to a plurality of other telephonic switches, a method for routing information at the telephonic switch comprising the steps of:

receiving signaling information at the telephonic switch from the plurality of other telephonic switches within the telecommunication network over a plurality of associated common-channel signaling link sets; and terminating the plurality of associated common-channel signaling link sets at an integrated message signal controller located at the telephonic switch.

2. In a telecommunication network having a telephonic switch for controlling telephonic call and service information which is transmitted to a plurality of other telephonic switches, a method for routing information at the telephonic switch comprising the steps of:

transmitting signaling information from the plurality of other telephonic switches within the telecommunication network over a plurality of associated common-channel signaling link sets to the telephonic switch; and receiving at a message signal controller of the telephonic switch the signaling information transmitted via the plurality of associated common-channel signaling link sets from the plurality of other telephonic switches, the message signal controller including a plurality of independent message signal interfaces at the telephonic switch, each independent message signal controller connected to at least one associated common-channel signaling link set between the telephonic switch and one of the other telephonic switches.

3. The method of claim 2 including the steps of terminating an A-Link link set connected at a signal transfer function to one of the independent message signal controllers located at the telephonic switch, and terminating another A-Link link set connected at the signal transfer function to the one other telephonic switch.

4. The method of claim 3 including the step of sending signaling information from the one other telephonic switch to the telephonic switch via the signaling transfer function in response to the associated common-channel signaling function between the one other telephonic switch and the telephonic switch becoming unavailable.

5. The method of claim 4 including the step of routing signaling between the telephonic switch and one of the other telephonic switches over a first signal transfer function of a redundant pair of signal transfer functions.

6. The method of claim 5 including the step of rerouting signaling between the telephonic switch and one of the other telephonic switches over a second signal transfer function of the redundant pair of signal transfer functions in response to failure of the first signal transfer function.

7. The method of claim 3 in which a plurality of A-Link link sets connect the signal transfer function with each of the other telephonic switches of the plurality of other telephonic switches.

8. The method of claim 2 in which the associated common-channel signaling link sets are F-Link link sets.

9. The method of claim 2 including the step of routing signaling information from the telephonic switch to the one other telephonic switch via the associated common-channel signal link set between the telephonic switch and the one other telephonic switch in response to the common channel signal link function becoming available.

10. In a telecommunication network having a telephonic switch for controlling telephonic call and service information which is transmitted to a plurality of other telephonic switches, a method for routing information at the telephonic switch comprising the steps of:

transmitting signaling information from the plurality of other telephonic switches within the telecommunication network over a plurality of associated common-channel signaling link sets to the telephonic switch;

receiving at a message signal controller of the telephonic switch the signaling information transmitted via the plurality of associated common-channel signaling link sets from the plurality of other telephonic switches; and terminating the plurality of associated common-channel signaling link sets at an integrated message signal controller located at the telephonic switch.

11. The method of claim 10 including the steps of connecting an A-Link link set between a signal transfer function and one other switches, and connecting an A-Link link set between the signal transfer function and the integrated message signal controller at the telephonic switch.

12. The method of claim 11 including the step of rerouting signaling information from the telephonic switch to one other telephonic switch via the signaling transfer function in response to the associated common-channel signaling link function between the one of the other telephonic switches and the telephonic switch becoming unavailable.

13. A telephonic switch comprising:

a message signal controller for receiving telephonic signaling information from a plurality of other telephonic switches; and a plurality of associated common-channel signal links connected to the message signal controller at the telephonic switch, the message signal controller terminating each of the plurality of associated common-channel signal links.

14. A telecommunication network comprising:

a telephonic switch having a message signal controller;

a plurality of other telephonic switches; and a plurality of associated common-channel signal links, in which the plurality of associated common-channel signal links are connected to the message signaling interface at the telephonic switch and a corresponding one of the plurality of other telephonic switches for transmission of telephonic signaling information, the message signaling interface including a plurality of independent message signal controllers which terminate each of the plurality of associated common-channel signal links on a corresponding independent message signal controller at the telephonic switch.

15. The telecommunication network of claim 14 including a signal transfer point having an A-Link link set connected to an independent message signal controller of the plurality of independent message signal controllers at the telephonic switch.

16. The telecommunication network of claim 15 in which transmission of telephonic signaling information is routed from the telephonic switch to the one other telephonic switch via the signal transfer point in response to the associated common-channel link set between the telephonic switch and the one other telephonic switch being unavailable.

17. The telecommunication network of claim 16 in which transmission of the telephonic signaling information is routed from the telephonic switch to the one other switch over the common channel link set in response to the common channel link function becoming available.

18. The telecommunication network of claim 15 including a first redundant signal transfer point and a second redundant signal transfer point each coupled with the telephonic switch and the plurality of other telephonic switches.

19. The telecommunication network of claim 18 in which the first redundant signal transfer point routes signaling messages between the telephonic switch and the other telephonic switches in response to the second redundant signal transfer point failing.

20. The telecommunication network of claim 14 including a signal transfer point coupled to the other telephonic switches and coupled to the integrated message signal interface at the telephonic switch by a plurality of A-Link link sets.

21. The telecommunication network of claim 20 in which transmission of telephonic signaling information is routed from the telephonic switch to one of the other switches via the signal transfer point in response to the associated common-channel link function between the telephonic switch and the corresponding other telephonic switch being unavailable.

22. A telecommunication network comprising:
a telephonic switch having a message signal controller;
a plurality of other telephonic switches; and
a plurality of associated common-channel signal links, in which the plurality of associated common-channel signal links are connected to the message signaling interface at the telephonic switch and a corresponding one of the plurality of other telephonic switches for transmission of telephonic signaling information, the message signaling interface including an integrated message signal interface at the telephonic switch to terminate the plurality of associated common-channel signal links sets.

23. A telecommunication network having a telephonic switch connected to a plurality of other telephonic switches comprising:
means for independently terminating associated common-channel link sets at the telephonic switch;
means for selecting a route between the telephonic switch and one of the other telephonic switches;
means for routing telephonic signaling information from the telephonic switch to the plurality of other telephonic switches across a primary route in response to the selection of the route; and
means for rerouting telephonic signaling information from the telephonic switch to the plurality of other telephonic switches across an alternate route in response to a fault occurring on the primary route.

24. An apparatus in a telecommunication network comprising:
an independent message signal interface, having a supervisor monitoring the state of a signal link function, for terminating a signaling link coupled to a network device in the telecommunication network;
another independent message signal interface, having another supervisor monitoring the state of another signal link function, for terminating another signaling link to another network device in the telecommunication network; and
a communication path between the supervisor and other supervisor for sharing state information of the independent message signal interface and the other independent message signal interface.

25. The apparatus of claim 24 further comprising a transceiver in the other independent message signal interface for transmission of a signaling message re-routed to the other network device by the other independent message signal interface in response to the supervisor identifying that the signal link function of the independent signal interface is unavailable from the state information.

26. The apparatus of claim 25 further comprising another transceiver in the independent message signal interface for transmission of the signaling message to the network device in response to the supervisor identifying the signal link function as being available from the state information.

27. The apparatus of claim 24 further comprising a transceiver in the other independent message signal interface for transmission of signaling message to the other network device when the independent message signal link interface is unavailable.

28. The apparatus of claim 24 in which the independent signal interface and the other independent signal interface terminate Signaling System 7 signaling links.

* * * * *